US00RE44520E

(19) United States
(12) Reissued Patent
Hartmann

(10) Patent Number: US RE44,520 E
(45) Date of Reissued Patent: Oct. 8, 2013

(54) TUBING HANGER WITH ANNULUS BORE

(75) Inventors: Michael P. Hartmann, Ingleside, TX (US); Rhonda Hartmann, legal representative, Ingleside, TX (US)

(73) Assignee: Cooper Cameron Corporation, Houston, TX (US)

(21) Appl. No.: 11/297,819

(22) Filed: Dec. 8, 2005

Related U.S. Patent Documents

Reissue of:
(64) Patent No.: 6,659,181
Issued: Dec. 9, 2003
Appl. No.: 10/008,104
Filed: Nov. 13, 2001

(51) Int. Cl.
*E21B 33/068* (2006.01)

(52) U.S. Cl.
USPC ..... 166/348; 166/368; 166/344

(58) Field of Classification Search
USPC ..... 166/335, 344, 338, 348, 360, 363–365, 166/368, 225
See application file for complete search history.

(56) References Cited

U.S. PATENT DOCUMENTS

| | | | | | |
|---|---|---|---|---|---|
| 2,889,886 | A | * | 6/1959 | Gould | 166/89.3 |
| 3,602,303 | A | * | 8/1971 | Blenkarn et al. | 166/360 |
| 4,887,672 | A | * | 12/1989 | Hynes | 166/344 |
| 4,903,774 | A | * | 2/1990 | Dykes et al. | 166/363 |
| 5,114,158 | A | * | 5/1992 | Le | 277/314 |
| 5,143,158 | A | * | 9/1992 | Watkins et al. | 166/344 |
| 5,372,199 | A | * | 12/1994 | Cegielski et al. | 166/368 |
| 5,535,826 | A | * | 7/1996 | Brown et al. | 166/363 |
| 5,544,707 | A | * | 8/1996 | Hopper et al. | 166/382 |
| 5,575,336 | A | * | 11/1996 | Morgan | 166/330 |
| 5,687,794 | A | * | 11/1997 | Watkins et al. | 166/363 |
| 5,941,310 | A | * | 8/1999 | Cunningham et al. | 166/345 |
| 5,992,527 | A | * | 11/1999 | Garnham et al. | 166/379 |
| 6,039,119 | A | * | 3/2000 | Hopper et al. | 166/368 |

(Continued)

FOREIGN PATENT DOCUMENTS

| | | |
|---|---|---|
| GB | 2192921 A | 1/1988 |
| WO | WO 00/47864 | 8/2000 |

(Continued)

OTHER PUBLICATIONS

SPE 23145; Sanders, R.O., *Installation of Concentric Subsea Completions From a Jack-Up in the Welland Field: A Case History,* Society of Petroleum Engineers, Inc., 1981, pp. 405-415.

(Continued)

*Primary Examiner* — Thomas Beach
*Assistant Examiner* — James Sayre
(74) *Attorney, Agent, or Firm* — Conley Rose, P.C.

(57) ABSTRACT

A completion system for a subsea well includes a tree having a generally cylindrical wall forming an internal bore therethrough and a production port extending laterally through the wall in communication with the internal bore. The internal wall has a landing arranged to support a tubing hanger having seals for sealing the production port between the tubing hanger and the internal wall, the production port being arranged to communicate with a lateral production fluid outlet port in the tubing hanger. A workover port extends laterally from an opening in the internal wall below the production port and the production port seals and a tubing annulus seal sealing the workover port from the tubing annulus. A tubing annulus port extends from an opening in the tree below the tubing annulus seal and the tubing annulus port and workover port being arranged to be in fluid communication externally of the internal bore.

18 Claims, 10 Drawing Sheets

(56) References Cited

U.S. PATENT DOCUMENTS

| | | | | |
|---|---|---|---|---|
| 6,062,314 | A * | 5/2000 | Nobileau | 166/368 |
| 6,227,300 | B1 * | 5/2001 | Cunningham et al. | 166/339 |
| 6,293,345 | B1 * | 9/2001 | Watkins | 166/368 |
| 6,302,212 | B1 * | 10/2001 | Nobileau | 166/368 |
| 6,360,822 | B1 * | 3/2002 | Robertson | 166/368 |
| 6,408,947 | B1 * | 6/2002 | Cunningham et al. | 166/339 |
| 6,453,944 | B2 * | 9/2002 | Bartlett | 137/601.01 |
| 6,470,968 | B1 * | 10/2002 | Turner | 166/348 |
| 6,755,254 | B2 * | 6/2004 | DeBerry | 166/368 |

FOREIGN PATENT DOCUMENTS

| | | |
|---|---|---|
| WO | WO 01/73254 | 10/2001 |
| WO | WO 01/73256 | 10/2001 |
| WO | WO 01/73259 | 10/2001 |
| WO | WO 01/73260 | 10/2001 |

OTHER PUBLICATIONS

SPE 13976 D.S. Huber, G.F. Simmers and C.S. Johnson; *Through Bore Subsea Christmas Trees;* Sep. 1985; (p. 15).

Design Certification Manuals FOR Phillips North Hewett Subsea Completion Well 48/30-10; Jul. 29, 1986; (p. 3).

National Supply Company (UK) Limited; *Through Bore Tree System and Workover Riser 7¹/₁₆" 5000 psi;* Jun. 1985; (pp. KD092771-KD092815).

National Supply Company (UK) Limited; *Through Bore Tree Syustem and Workover Riser 7¹/₁₆"-5M*; Oct. 1985; (pp. KD092816-KD092837).

National Oilwell (UK) Limited; *Through Bore Tree System;* Jan. 1993; St. Magnus House; (p. 24).

The Nordic Council of Ministers Program for Petroleum Technology; *Electric Submersible Pump for Subsea Completed Wells;* Nov. 26-27, 1991; S. Sangesland; (p. 14).

Division of Petroleum Engineering and Applied Geophysics; NHT. Trondheim; Mar. 1990; *A Simplified Subsea System Design;* Sigbjorn Sangesland; (pp. 1-18).

Division of Petroleum Engineering and Applied Geophysics, NTH; *Simplified Subsea System Design;* Oct. 23-27 & Nov. 20-24, 1989; (pp. 1-31).

Welland Subsea Tree; Figure 8; (1 sheet) undated.

* cited by examiner

TUBING HANGER WITH ANNULUS BORE

Matter enclosed in heavy brackets [ ] appears in the original patent but forms no part of this reissue specification; matter printed in italics indicates the additions made by reissue.

BACKGROUND OF THE INVENTION

The present invention relates to a flow completion apparatus for producing oil or gas from a subsea well. More particularly, the invention relates to a flow completion apparatus which comprises a tubing hanger having an annulus bore which is adapted to communicate with a choke and kill line of a blowout preventer which is installed over the tubing hanger during installation and workover of the flow completion apparatus.

Flow completion assemblies for producing oil or gas from subsea wells may generally be categorized as either conventional or horizontal. A typical horizontal flow completion assembly is disclosed in U.S. Pat. No. 6,039,119, hereby incorporated herein by reference.

International Publication No. WO 01/73259 of International Application No. PCT/US01/09607 filed Mar. 22, 2001 and published Oct. 4, 2001, shows a tubing hanger with an annulus bore. International Publication No. WO 01/73259 is hereby incorporated herein by reference.

SUMMARY OF THE INVENTION

The flow completion apparatus comprises a wellhead housing which is installed at the upper end of the wellbore; a tubing spool which is connected over the wellhead housing and which includes a central bore which extends axially therethrough, a production outlet which communicates with the central bore, and an annulus passageway which communicates with the tubing annulus; a tubing hanger which is supported in the central bore and is connected to an upper end of the tubing string, the tubing hanger including a production bore which extends axially therethrough and a production passageway which communicates between the production bore and the production outlet; a first closure member which is positioned in the production bore above the production passageway; production seals positioned between the tubing hanger and central bore above and below the production passageway; and a tubing annulus seal which is positioned between the tubing hanger and the central bore below the production passageway and production seals. Furthermore, the tubing spool also comprises a workover passageway which extends between the annulus passageway and a portion of the central bore that is located between the production seals and the tubing annulus seal, and the tubing hanger also comprises an annulus bore which extends between the workover passageway and the upper end of the tubing hanger. In this manner, fluid communication between the tubing annulus and the upper end of the tubing hanger may be established through the annulus passageway, the workover passageway, and the annulus bore.

The flow completion apparatus further comprises a blowout preventer which is removably connectable to the top of the tubing spool and which includes a BOP bore, at least one set of BOP rams, and at least one choke and kill line that communicates with a portion of the BOP bore which is located below the BOP rams; and a tubing hanger running tool which is removably connectable to the top of the tubing hanger and which includes a generally cylindrical outer diameter surface and a production port that communicates with the production bore in the tubing hanger. An annulus passageway extends between the annulus bore in the tubing hanger and the BOP choke and kill line. This passageway may either be the annular area around the tubing hanger running tool or may include an annulus port through the running tool that communicates between the annulus bore and an opening which is formed in the outer diameter surface of the tubing hanger running tool to communicate with the BOP choke and kill line. In this manner, fluid communication between the tubing annulus and the BOP choke and kill line may be established through the annulus passageway, the workover passageway, the annulus bore, either the annular area around the tubing hanger running tool or an annulus port in the tubing hanger running tool, and the portion of the BOP bore which is located below the closed BOP ram.

The annulus bore in the tubing hanger provides a convenient means for connecting the tubing annulus with the BOP choke and kill line. An annulus port in the tubing hanger running tool provides a closed path between the annulus bore in the tubing hanger and the BOP choke and kill line.

A first barrier between the wellbore and the environment is provided by both the first closure member in the production bore and the tubing annulus seal between the tubing hanger and the tubing spool. In addition, a second barrier between the wellbore and the environment is provided by both a second closure member that is positioned in the production bore above the first closure member and the production seals that are positioned between the tubing hanger and the tubing spool above the tubing annulus seal. In this manner, both the first and second barriers between the wellbore and the environment are mounted in or on the tubing hanger.

These and other objects and advantages of the present invention will be made apparent from the following detailed description, with reference to the accompanying drawings. In the drawings, the same reference numerals are used to denote similar components in the various embodiments.

DESCRIPTION OF THE PREFERRED EMBODIMENTS

Figure 1:
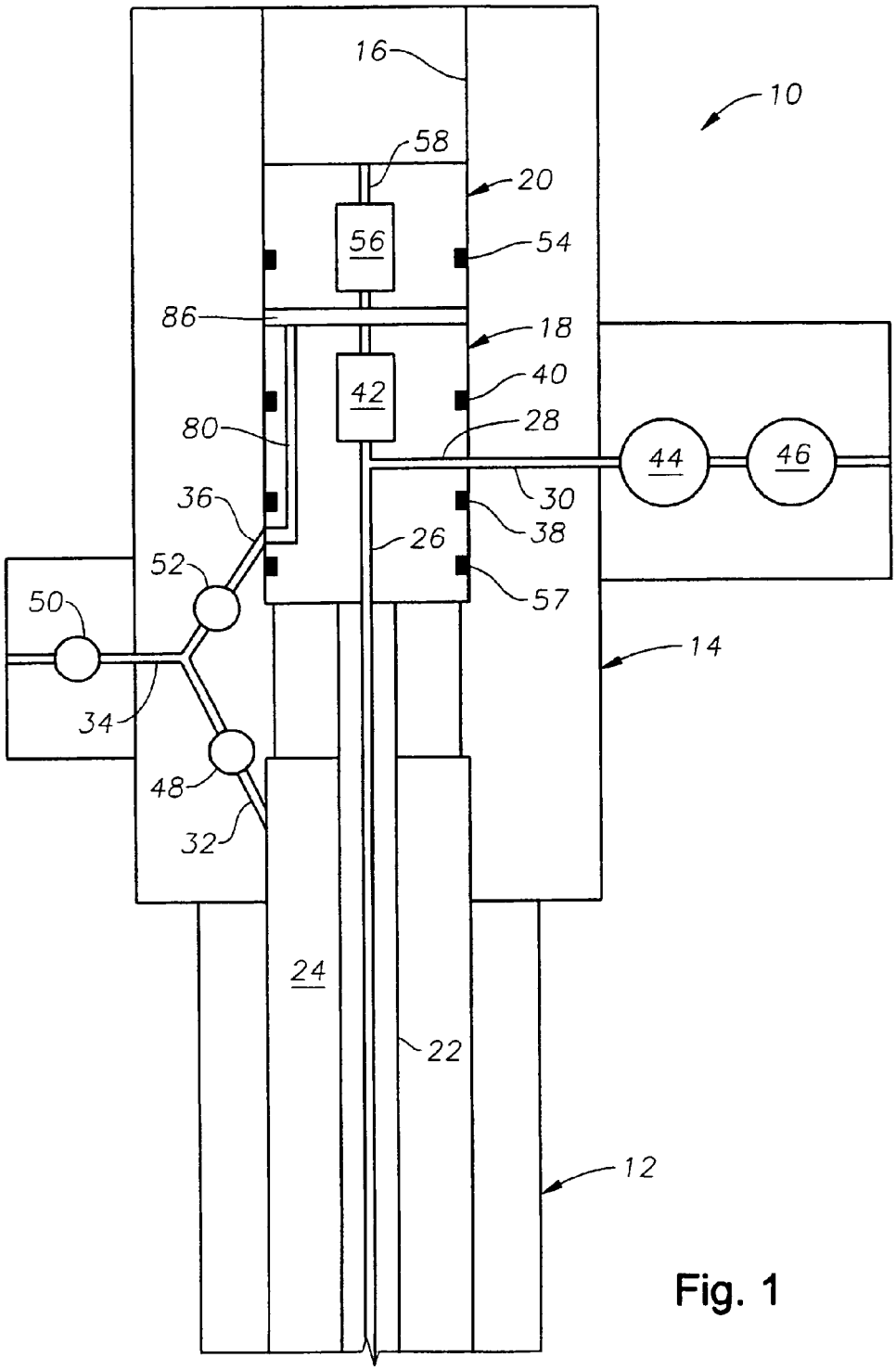
FIG. 1 is a representation of one embodiment of the flow completion apparatus shown in the production mode of operation with the tubing hanger annulus bore extending between a first and second closure member.

The present invention relates to methods and apparatus for flow completion and particularly for circulation in the borehole of a well during installation and workover. The present invention is susceptible to embodiments of different forms. There are shown in the drawings, and herein will be described in detail, specific embodiments of the present invention with the understanding that the present disclosure is to be considered an exemplification of the principles of the invention, and is not intended to limit the invention to that illustrated and described herein.

In particular, various embodiments of the present invention provide a number of different constructions and methods of operation of the completion system. The embodiments of the present invention also provide a plurality of methods for circulation in the borehole of a well. It is to be fully recognized that the different teachings of the embodiments discussed below may be employed separately or in any suitable combination to produce desired results. Reference to up or down will be made for purposes of description with up meaning away from the bottom of the well and down meaning toward the bottom of the well.

In the description which follows, the use of the same reference numerals throughout the specification and drawings indicates like parts. The drawing figures are not necessarily to scale. Certain features of the invention may be shown in exaggerated in scale or in somewhat schematic form and some details of conventional elements may not be shown in the interest of clarity and conciseness.

Referring initially to FIG. 1, one embodiment of a flow completion apparatus according to the present invention, is generally indicated by reference numeral 10. The flow completion apparatus 10 comprises a wellhead 12, a tubing spool 14 which is connected and sealed to the wellhead and which includes a central bore 16 extending axially therethrough, a generally annular tubing hanger 18 which is supported on a shoulder located in the central bore, and a tree cap 20 which is installed in the central bore above the tubing hanger. The tubing hanger 18 is secured to the tubing spool 14 by a lockdown mechanism (not shown) and suspends a tubing string 22 that extends into the well bore and defines a tubing annulus 24 surrounding the tubing string. Tubing hanger 18 also includes a production bore 26 which communicates with the flowbore of the tubing string 22 and a lateral production passageway 28 which extends between the production bore 26 and the outer diameter of the tubing hanger. The tubing spool 14 includes a production outlet 30 which communicates with the production passageway 28, an annulus passageway 32 which communicates with the tubing annulus 24, and an annulus outlet 34 which is connected to the annulus passageway 32 and a workover passageway 36 which extends between the annulus passageway 32 and an area 86 of the central bore 16 above the tubing hanger 18. In addition, the tubing hanger 18 is sealed to the tubing spool 14 by upper and lower, preferably metal, production seal rings 40, 38, each of which engages a corresponding annular sealing surface formed on the wall forming central bore 16. The communication between the workover passageway 36 and the tubing annulus 24 is sealed by a tubing annulus seal ring 57. Furthermore, the production bore 26 is sealed above the production passageway 28 by a suitable closure member 42, such as a plug, which directs the flow of oil or gas from the tubing string 22 into the production passageway 30.

The tubing hanger 18 also includes an annulus bore 80 which extends between the upper end and lower end of the tubing hanger 18. In this manner, communication between the tubing annulus 24 and area 86 above the upper end of tubing hanger 18 is provided by the annulus passageway 32, the workover passageway 36, and the annulus bore 80. This arrangement permits communication between the tubing annulus 24 and area 86 and also a choke and kill line in a BOP with tree cap 20 removed as shown in FIG. 2.

The flow completion apparatus 10 may also comprise a production master valve 44 and a production wing valve 46 to control flow through the production outlet 30, and an annulus master valve 48, an annulus wing valve 50 and a workover valve 52 to control flow through the annulus passageway 32, the annulus outlet 34 and the workover passageway 36, respectively. While these valves may be any suitable closure members, they are preferably remotely operated gate valves. Moreover, some or all of the valves may be incorporated into the body of the tubing spool 14, into separate valve blocks which are bolted onto the tubing spool, or into individual valve assemblies which are connected to their respective outlets or passageways in the tubing spool with separate lengths of conduit. Furthermore, the production outlet 30 and the annulus outlet 34 are preferably connected to respective flow loops which communicate with a surface vessel, either directly or via a manifold, in a manner that is well known in the art.

In the production mode of operation of the flow completion apparatus 10, shown in FIG. 1, a first barrier between the well bore and the environment is provided by the closure member 42 production seals 38, 40, and the tubing annulus seal 57, which together serve to isolate the fluid in the wellbore from the environment above the tubing hanger. The second barrier is provided by the tree cap 20 and by a typically metal seal ring 54 which is disposed between the tree cap 20 and the tubing spool 14 and a wireline plug 56 which is positioned in an axial bore 58 extending through the tree cap. Thus, in the completion assembly 10, the first barrier is associated with the tubing hanger 18 while the second barrier is associated with the tree cap 20. Although not shown in FIG. 1, the tree cap 20 also includes a lockdown mechanism to secure the tree cap to the tubing spool 14.

Figure 2:
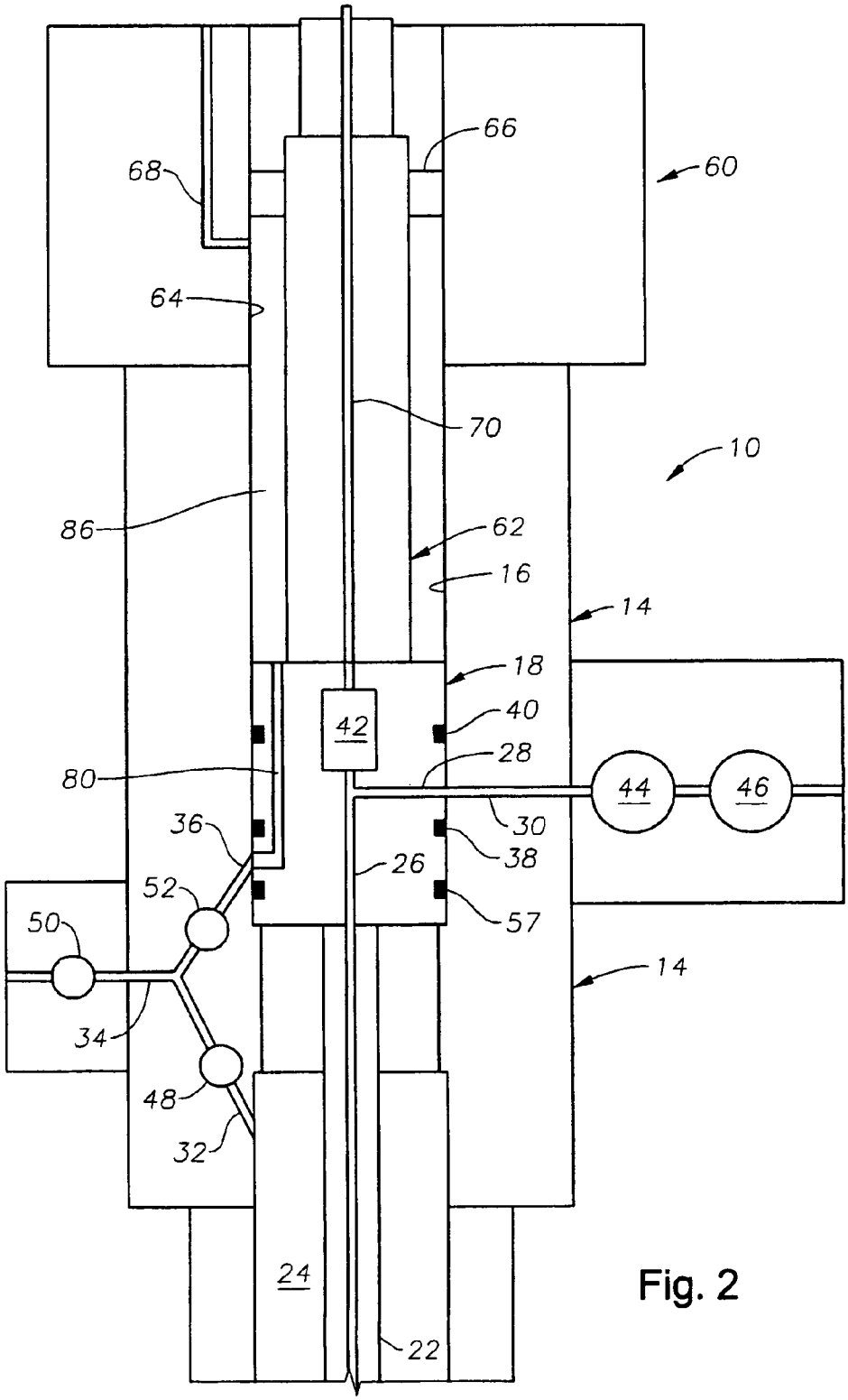
FIG. 2 is a representation of the flow completion apparatus of FIG. 1 shown in the installation and workover mode of operation with an annulus passageway extending from the tubing hanger annulus bore to the choke and kill line.

Referring now to FIG. 2, the flow completion assembly 10 is shown in the installation or workover mode of operation. In either of these modes of operation, a blowout preventer 60 is connected to the top of the tubing spool 14 and a tubing hanger running tool 62 is attached to the top of the tubing hanger 18. The BOP includes an internal BOP bore 64, at least one set of rams 66 which is capable of sealing against the tubing hanger running tool 62, and at least one choke and kill line 68 for providing communication between the BOP bore below the rams 66 and a surface vessel (not shown). In addition, the tubing hanger running tool 62 comprises an internal bore 70, or production port, which connects to the production bore 26 via a production stab (not shown). Also, although the BOP rams are described herein as sealing against the tubing hanger running tool, it should be understood that the rams could instead seal against another member, such as an extension member or a work string, which comprises a production port that communicates with the production port of the tubing hanger running tool.

During both installation and workover of the flow completion assembly 10, communication between the tubing annulus 24 and the surface vessel may be established through the annulus passageway 32, the workover passageway 36, the annulus bore 80, the central bore 16, the BOP bore 64, and the choke and kill line 68. For example, deep well circulation can be accomplished by pumping fluid down the tubing hanger running tool bore 70, through the production bore 26, through the flowbore of tubing string 22, around or through the lower end of the tubing string 22, up the tubing annulus 24, through the annulus passageway 32, through the workover passageway 36, through the annulus bore 80, into the central bore 16 above the tubing hanger 18, into the BOP bore 64 and through the BOP choke and kill line 68 to the surface.

Figure 3:
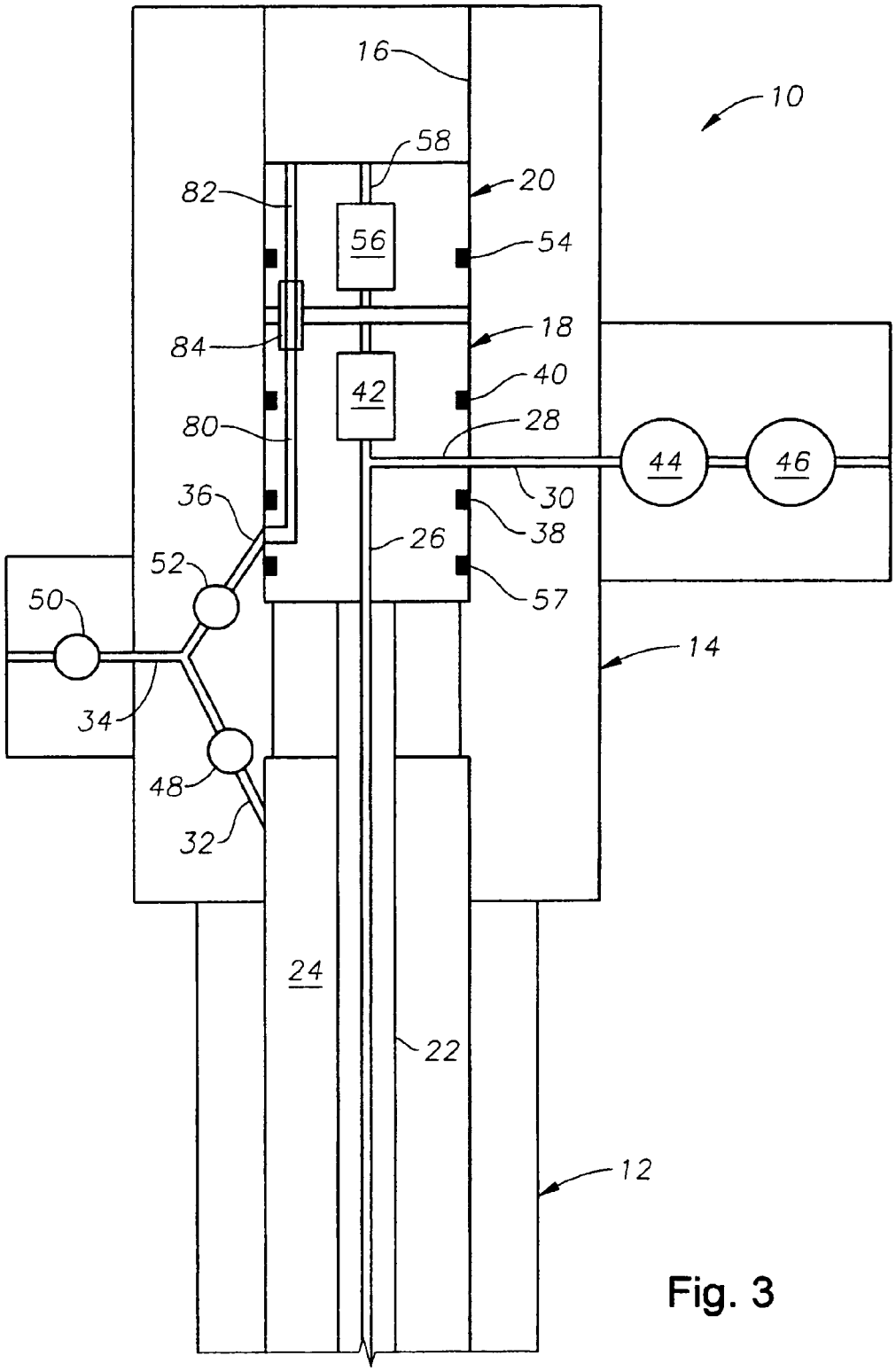
FIG. 3 is a representation of another embodiment of the flow completion apparatus shown in the production mode of operation with an annulus bore extending from the workover passageway to that portion of the internal bore of the spool tree above the first and second closure members.
Figure 4:
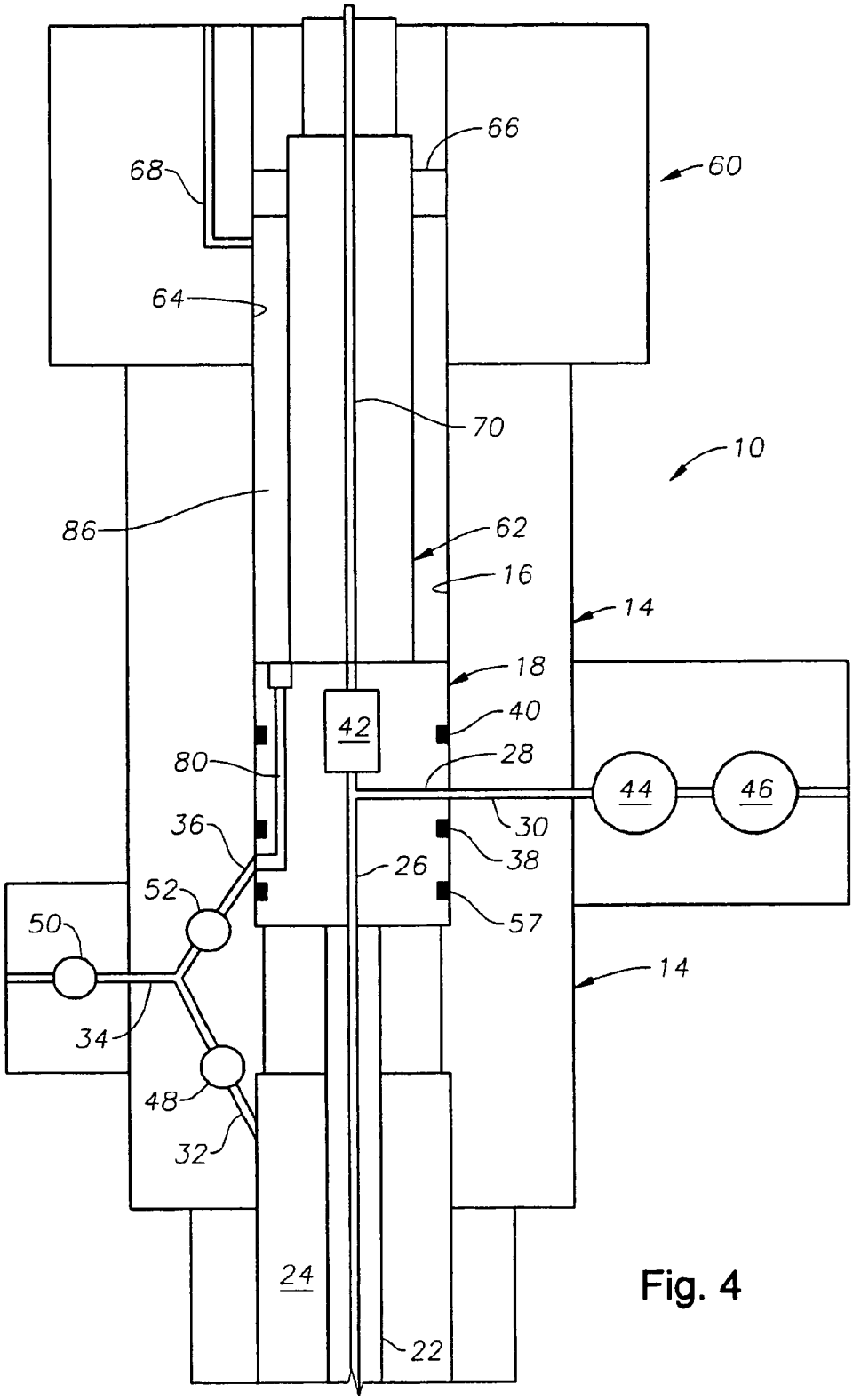
FIG. 4 is a representation of the flow completion apparatus of FIG. 3 shown in the installation workover mode of operation with an annulus passageway extending from the tubing hanger annulus bore to the choke and kill line.

Referring now to FIGS. 3 and 4, there is shown an alternative embodiment of the flow completion assembly 10 of FIGS. 1 and 2. Annulus bore 80 may be made in flow communication with a secondary annulus bore 82 extending through tree cap 20 by including an annulus stab 84 that seals into the top of the annulus bore 80 and into the secondary annulus bore 82 in the bottom of tree cap 20. This provides an annulus bore which extends from workover port 36 to that portion of the internal bore 16 of tubing spool 14 above both the first and second closure members, namely tree cap 20 and wire line plug 42, respectively. Secondary annulus bore 82 may be closed and sealed by a seal stab (not shown) installed in the upper end of secondary annulus bore 82

Figure 5:
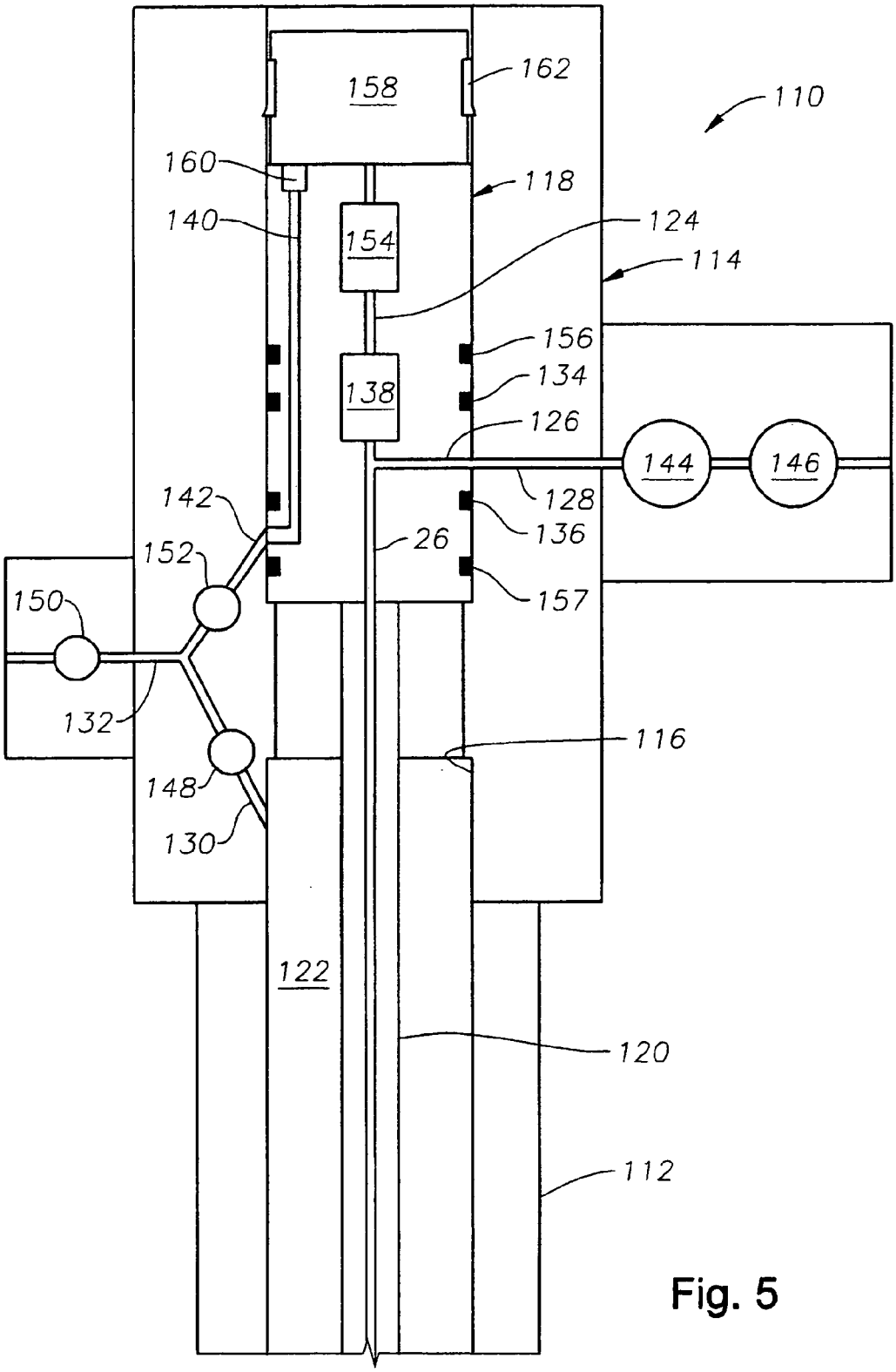
FIG. 5 is a representation of a still another embodiment of the flow completion apparatus shown in the production mode of operation with an annulus bore extending to the top of the tubing hanger and sealed with a seal stab.

Referring now to FIG. 5, another embodiment of a flow completion apparatus according to the present invention is generally indicated by reference numeral 110. The flow completion apparatus comprises a wellhead 112, tubing spool 114 which is mounted on the wellhead which includes a central bore 116 extending axially therethrough, and a generally annular tubing hanger 118 which is supported on a shoulder located in the central bore and from which is suspended a tubing string 120 that extends into the well bore and defines a tubing annulus 122 surrounding the tubing string. The tubing hanger 118 is secured to the tubing spool 114 by a lockdown mechanism (not shown) and includes a production bore 124 which communicates with the flowbore of the tubing string 120 and a lateral production passageway 126 which extends between the production bore 124 and the outer diameter of the tubing hanger. Similarly, the tubing spool 114 includes a production outlet 128 which communicates with the production passageway 126, an annulus passageway 130 which communicates with the tubing annulus 122, and an annulus outlet 132 which is connected to the annulus passageway. In addition, the tubing hanger 118 is sealed to the tubing spool 114 by an upper and lower, preferably metal, production seal rings 134, 136, each of which engages a corresponding annular sealing surface formed on the wall of central bore 116. Furthermore, the production bore 124 is sealed above the production passageway 126 by a suitable closure member 138 which directs the flow of oil or gas from the tubing string 120 into the production passageway 126. Ring seals 156, 157, located above and below production port 128 and production seals 134, 136, sealingly engage a corresponding annular sealing surface formed by the central bore 116.

The tubing hanger 118 also includes an annulus bore 140 which extends between the top and the lower outer diameter of the tubing hanger 118, and the tubing spool 114 comprises a workover passageway 142 that extends between the annulus passageway 130 and the annulus bore 140. The communication between the workover passageway 142 and the tubing annulus 122 is sealed by tubing annulus seal ring 157. In this manner, communication between the tubing annulus 122 and the top of tubing hanger 118 is provided by the annulus passageway 130, the workover passageway 142, and the annulus bore 140. This arrangement permits communication between the tubing annulus 122 and a BOP to be routed through a tubing hanger running tool, shown in FIG. 6, rather than in the area 186 of the central bore 116 above the tubing hanger 118.

The flow completion apparatus 110 may also comprises a production master valve 144 and a production wing valve 146 to control flow through the production outlet 128, and an annulus master valve 148, an annulus wing valve 150 and a workover valve 152 to control flow through the annulus passageway 130, the annulus outlet 132 and the workover passageway 142, respectively. While these valves may be any suitable closure members, they are preferably remotely operated gate valves. Moreover, some or all of the valves may be incorporated into the body of the tubing spool 114, into separate valve blocks which are bolted onto the tubing spool, or into individual valve assemblies which are connected to their respective outlets or passageways in the tubing spool with separate lengths of conduit. Furthermore, the production outlet 128 and the annulus outlet 132 are preferably connected to respective flow loops which communicate with a surface vessel, either directly or via a manifold, in a manner that is well known in the art.

In the production mode of operation of the flow completion apparatus 110, shown in FIG. 5, production seal 134 and tubing annulus seal 157 together function as a double barrier to isolate the fluid in the production passageway 126 from the environment below the tubing hanger 118 and production seal 134 and secondary seal 156 together function as a double barrier to isolate the fluid in the production passageway 126 from the environment above the tubing hanger 118.

In accordance with the present invention, a first barrier between the well bore and the environment is provided by the closure member 138 and the production seals 134, 136, which together serve to isolate the fluid in the production bore from the environment above and below the tubing hanger 118. A second barrier between the well bore and the environment is provided by a suitable second closure member 154, which is mounted in the production bore 124 above the closure member 138, and secondary seal 156 and tubing annulus seal 157, preferably a metal ring seals, which are mounted on the tubing hanger 118 above and below production passageway 126. Thus, the necessary first and second barriers for isolating the production passageway 126 from the environment are provided by components which are mounted on or in the tubing hanger 118.

The present invention also provides for isolating the tubing annulus 122 from the environment above the tubing hanger 118 during the production mode of operation. Provided the annular master valve 148 and the workover valve 152 are closed, the production seals 134, 136, the secondary seal 156, and the tubing annulus seal 157 will provide the required first and second barriers between the tubing annulus and the environment. However, when pressure in the tubing annulus 122 needs to be bled off through the annulus passageway 130 and the annulus outlet 132, or when gas is introduced into the tubing annulus through the annulus outlet and the annulus passageway during gas lift applications, the annulus master valve 148 must be opened.

Therefore, the flow completion apparatus preferably also comprises a tree cap 158 which includes an annulus stab 160 that seals into the top of the annulus bore 140 to provide a second barrier, in conjunction with the workover valve 152, between the tubing annulus 122 and the environment when the environment master valve 148 is open. While the tree cap 158 may include an annular, preferably non-metallic seal (not shown) to seal against the tubing spool 114 and thereby prevent sea water from entering the central bore 116, the tree cap is not intended to provide a barrier against well pressure in the production bore. The tree cap 158 is preferably landed on the tubing hanger 118 and locked to the tubing spool 114 with a convention lockdown mechanism 162. This lockdown mechanism will provide a backup to the lockdown mechanism used to secure the tubing hanger to the running tool. It should be noted that, although the tree cap 158 is depicted as an internal tree cap, it could instead be configured as an external tree cap.

Figure 6:
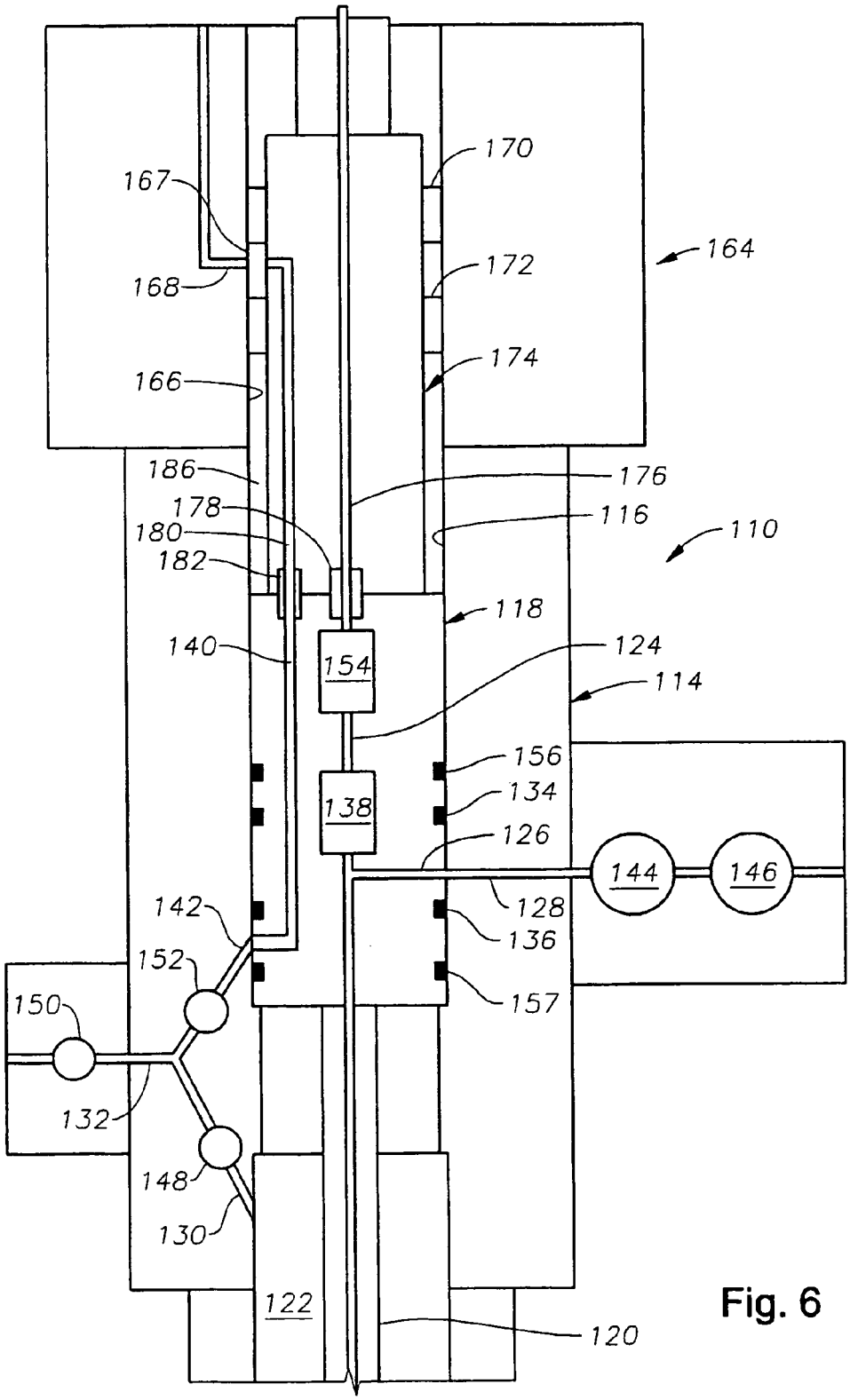
FIG. 6 is a representation of the flow completion apparatus of FIG. 5 shown in the installation and workover mode of operation with a passageway extending through the running tool between the tubing hanger annulus bore and the choke and kill line.

Referring now to FIG. 6, during installation and workover of the flow completion apparatus 110, a BOP 164 is lowered on a riser (not shown) and connected and sealed to the top of the tubing spool 114. The BOP 164 includes an internal BOP bore 166, at least one choke and kill line 168, and one or more sets of BOP rams 170, 172. In addition, a tubing hanger running tool 174 is connected to the top of the tubing hanger 118. The tubing hanger running tool 174 is either connected to the tubing hanger at a surface vessel and used to lower the tubing hanger into the tubing spool during installation of the tubing hanger, or lowered through a riser and the BOP and connected to the tubing hanger in the tubing spool in anticipation of a workover operation. The tubing hanger running tool 174 is shown to comprise a generally cylindrical outer diameter surface, a production port 176 which is connected to a production bore 124 in the tubing hanger 118 by a suitable production seal stab 178, and an annulus port 180 which extends from a portion of the outer diameter surface of tubing hanger running tool 174 to a suitable annulus seal stab 182 that engages the tubing hanger annulus bore 140.

Thus, with the BOP rams 170, 172 sealed against the tubing hanger running tool 174, communication between the tubing annulus 122 and the BOP choke and kill line 168 may be established through the annulus passageway 130, the workover passageway 142, the annulus bore 140, the annulus port 180, and the portion 167 of the BOP bore 166 which is located between the BOP rams 170, 172. For example, with the annulus wing valve 150 closed, pressure can be transmitted from the surface vessel down the choke and kill line 168, through the annulus portion 180, through the tubing hanger annulus bore 140, through the workover passageway 142, through the annulus passageway 130, and into the tubing annulus 122. The well circulation may be accomplished by closing both the annulus wing valve 150 and the production master valve 144 and pumping fluid down the choke and kill line 168 through the annulus port 180, through the annulus bore 140, through the workover passageway 142, through the annulus passageway 130, down the tubing annulus 122, past the downhole packer, up the tubing string 120, through the production bore 124, and up the production port 176. Moreover, since the flow between the tubing hanger annulus bore 140 and the choke and kill line 168 is restricted by the tubing hanger running tool 174, no possibility exists that the flow will foul the tubing hanger lockdown mechanism or erode the central bore 116.

Figure 7:
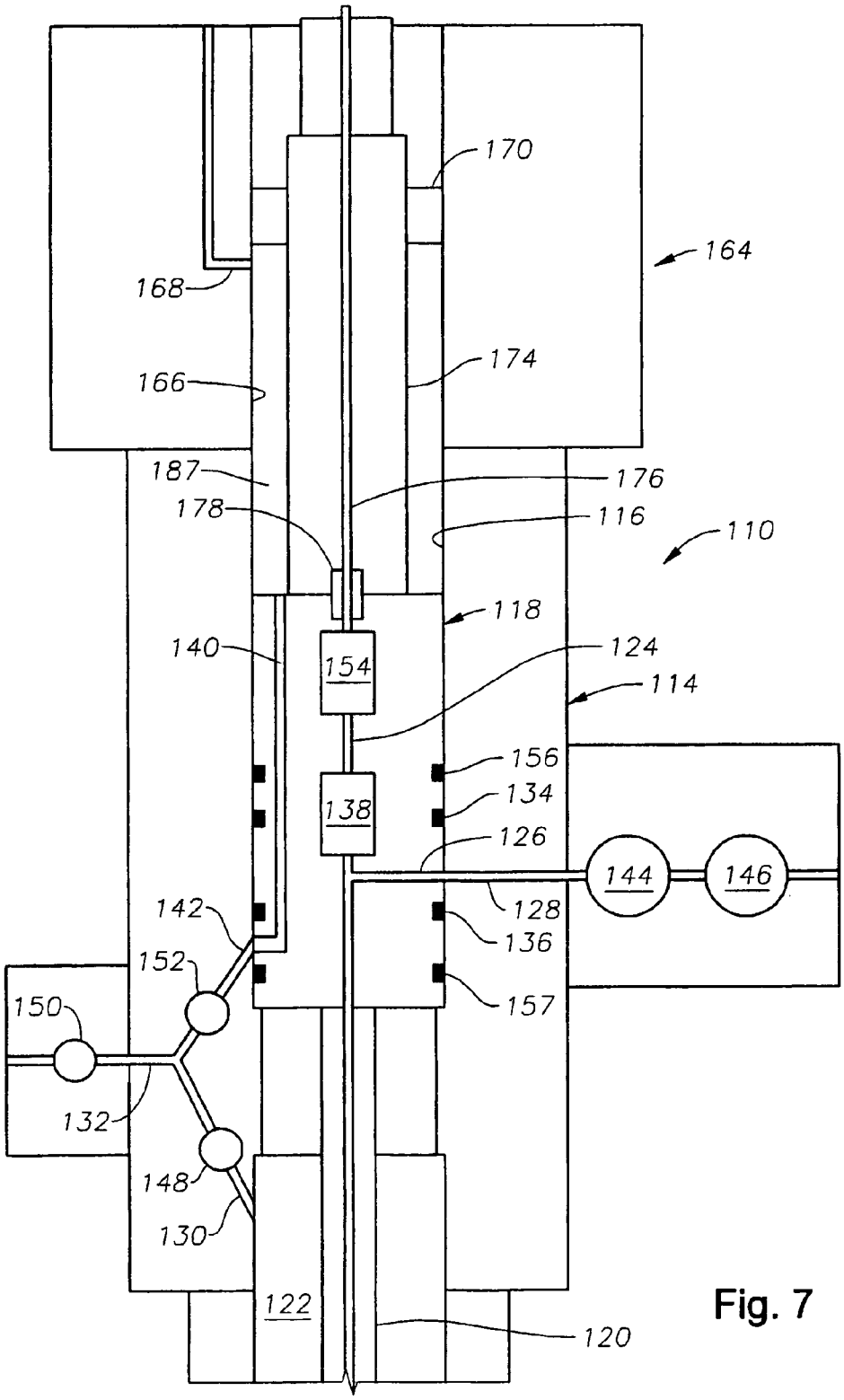
FIG. 7 is a representation of the flow completion apparatus of FIG. 5 shown in the installation and workover mode of operation with a passageway extending around the running tool between the tubing hanger annulus bore and the choke and kill line.

Referring now to FIG. 7, there is shown an alternative embodiment of the flow completion assembly 110 of FIG. 6. Annulus bore 140 communicates with the choke and kill line 168 through an annular passageway 187 between the tubing hanger running tool 174 and the internal bores of the BOP 166 and the tubing spool 114.

Figure 8:
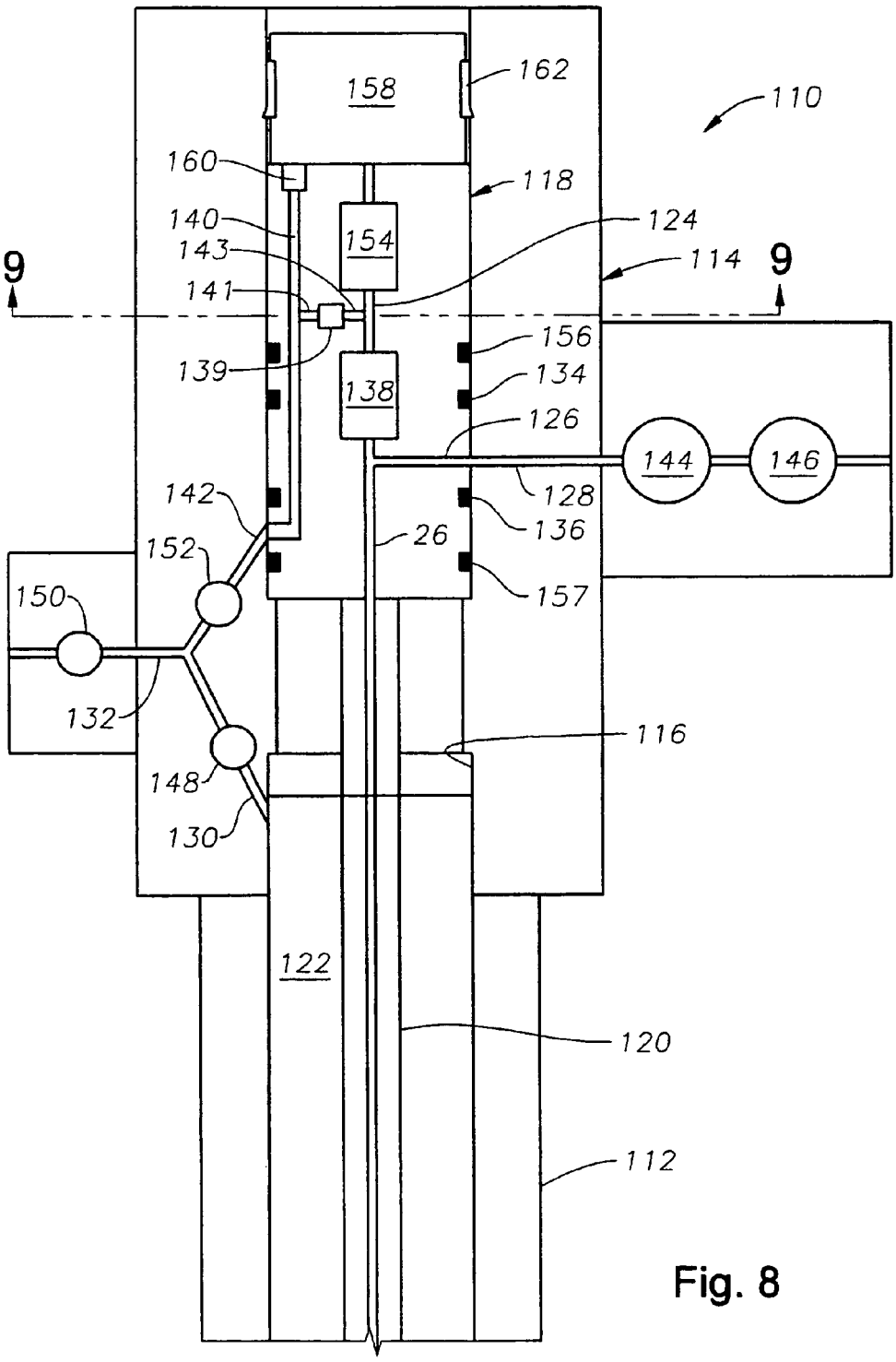
FIG. 8 is a representation of a further embodiment of the flow completion apparatus shown in the production mode of operation with an annulus bypass bore extending between the annulus bore and the production bore.

Referring now to FIG. 8, an alternate embodiment of a flow completion apparatus according to the present invention as described in FIG. 5, is generally indicated by reference numeral 110. The flow completion apparatus comprises a wellhead 112, tubing spool 114 which is mounted on the wellhead which includes a central bore 116 extending axially therethrough, and a generally annular tubing hanger 118 which is supported on a shoulder located in the central bore and from which is suspended a tubing string 120 that extends into the well bore and defines a tubing annulus 122 surrounding the tubing string. The tubing hanger 118 is secured to the tubing spool 114 by a lockdown mechanism (not shown) and includes a production bore 124 which communicates with the flowbore of the tubing string 120 and a lateral production passageway 126 which extends between the production bore and the outer diameter of the tubing hanger. Similarly, the tubing spool 114 includes a production outlet 128 which communicates with the production passageway 126, an annulus passageway 130 which communicates with the tubing annulus 122, and an annulus outlet 132 which is connected to the annulus passageway. In addition, the tubing hanger 118 is sealed to the tubing spool 114 by an upper and lower, preferably metal, production seal rings 134, 136, each of which engages a corresponding annular sealing surface formed by the wall of the central bore 116. Furthermore, the production bore 124 is sealed above the production passageway 126 by a suitable closure member 138 which directs the flow of oil or gas from the tubing string 120 into the production passageway 126. Ring seals 156, 157, located above and below production port 128 and production seals 134, 136, sealingly engage a corresponding annular sealing surface formed by the wall of the central bore 116.

The tubing hanger 118 also includes an annulus bore 140 which extends between the top and the outer diameter of the tubing hanger 118, and the tubing spool 114 comprises a workover passageway 142 that extends between the annulus passageway 130 and the annulus bore 140. The communication between the workover passageway 142 and the tubing annulus 122 is sealed by an annular seal ring 157. Tubing hanger 118 also includes an annulus bypass bore 141 extending from annulus bore 140 through valve 139 and continuing through bypass bore 143 to production bore 124. In this manner fluid communication between the tubing annulus 122 and the production bore 124 above closure member 138 is provided.

Figure 9:
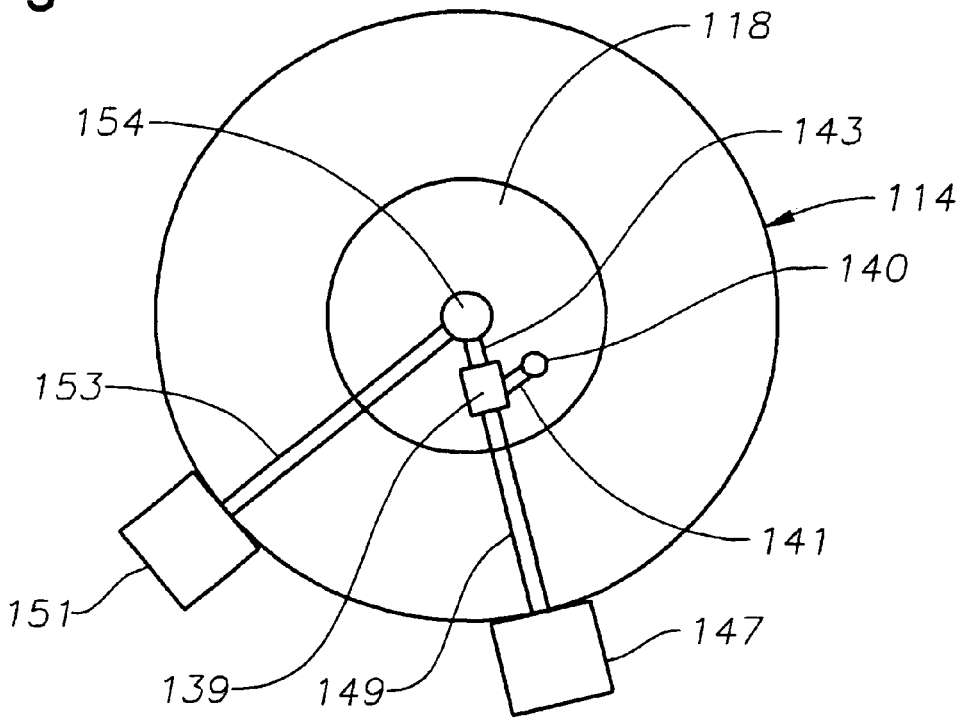
FIG. 9 is a cross section at plane 9-9 in FIG. 8.

Referring now to FIG. 9, a section view of FIG. 8 generally indicated a valve actuation member 147 and valve stem 149 for valve 139. Valve actuation as indicated here is described in U.S. Pat. No. 5,992,527 which is hereby incorporated herein by reference.

Similar valve actuation member 151 and valve stem 153 are shown as an alternate for valve closure member 154. The valve actuation member 151 attached to tubing spool 114 may be used outside or inside the necessary second barriers for isolating the production bore 124 from the environment as described earlier.

The flow completion apparatus 110 may also comprise a production master valve 144 and a production wing valve 146 to control flow through the production outlet 128, and an annulus master valve 148, an annulus wing valve 150 and a workover valve 152 to control flow through the annulus passageway 130, the annulus outlet 132 and the workover passageway 142, respectively. While these valves may be any suitable closure members, they are preferably remotely operated gate valves. Moreover, some or all of the valves may be incorporated into the body of the tubing spool 114, into separate valve blocks which are bolted onto the tubing spool, or into individual valve assemblies which are connected to their respective outlets or passageways in the tubing spool with separate lengths of conduit. Furthermore, the production outlet 128 and the annulus outlet 132 are preferably connected to respective flow loops which communicate with a surface vessel, either directly or via a manifold, in a manner that is well known in the art.

In the production mode of operation of the flow completion apparatus 110, shown in FIG. 8, production seal 136 and tubing annulus seal 157 together function as a double barrier to isolate the fluid in the production passageway 126 from the environment below the tubing hanger 118 and production seal 134 and secondary seal 156 together function as a double barrier to isolate the fluid in the production passageway 126 from the environment above the tubing hanger 118.

In accordance with the present invention, a first barrier between the well bore and the environment is provided by the closure member 138 and the production seals 134, 136, which together serve to isolate the fluid in the production bore from the environment above and below the tubing hanger 118. A second barrier between the well bore and the environment is provided by a suitable second closure member 154, which is mounted in the production bore 124 above the closure member 138, and secondary seal 156 and tubing annulus seal 157, preferably a metal ring seals, which are mounted on the tubing hanger 118 above and below production passageway 126. Thus, the necessary first and second barriers for isolating the production passageway 126 from the environment are provided by components which are mounted on or in the tubing hanger 118.

The present invention also provides for isolating the tubing annulus 122 from the environment above the tubing hanger 118 during the production mode of operation. Provided the annular master valve 148 and the workover valve 152 are closed, the production seals 134, 136, the secondary seal 156, and the tubing annulus seal 157 will provide the required first and second barriers between the tubing annulus and the environment. However, when pressure in the tubing annulus 122 needs to be bled off through the annulus passageway 130 and the annulus outlet 132, or when gas is introduced into the tubing annulus through the annulus outlet and the annulus passageway during gas lift applications, the annulus master valve 148 must be opened.

Therefore, the flow completion apparatus preferably also comprises a tree cap 158 which includes an annulus stab 160 that seals into the top of the annulus bore 140 to provide a second barrier, in conjunction with the workover valve 152, between the tubing annulus 122 and the environment when the environment master valve 148 is open. While the tree cap 158 may include an annular, preferably non-metallic seal (not shown) to seal against the tubing spool 114 and thereby prevent sea water from entering the central bore 116, the tree cap is not intended to provide a barrier against well pressure in the production bore. The tree cap 158 is preferably landed on the tubing hanger 118 and locked to the tubing spool 114 with a convention lockdown mechanism 162. This lockdown mechanism will provide a backup to the lockdown mechanism used to secure the tubing hanger to the running tool. It should be noted that, although the tree cap 158 is depicted as an internal tree cap, it could instead be configured as an external tree cap.

Figure 10:
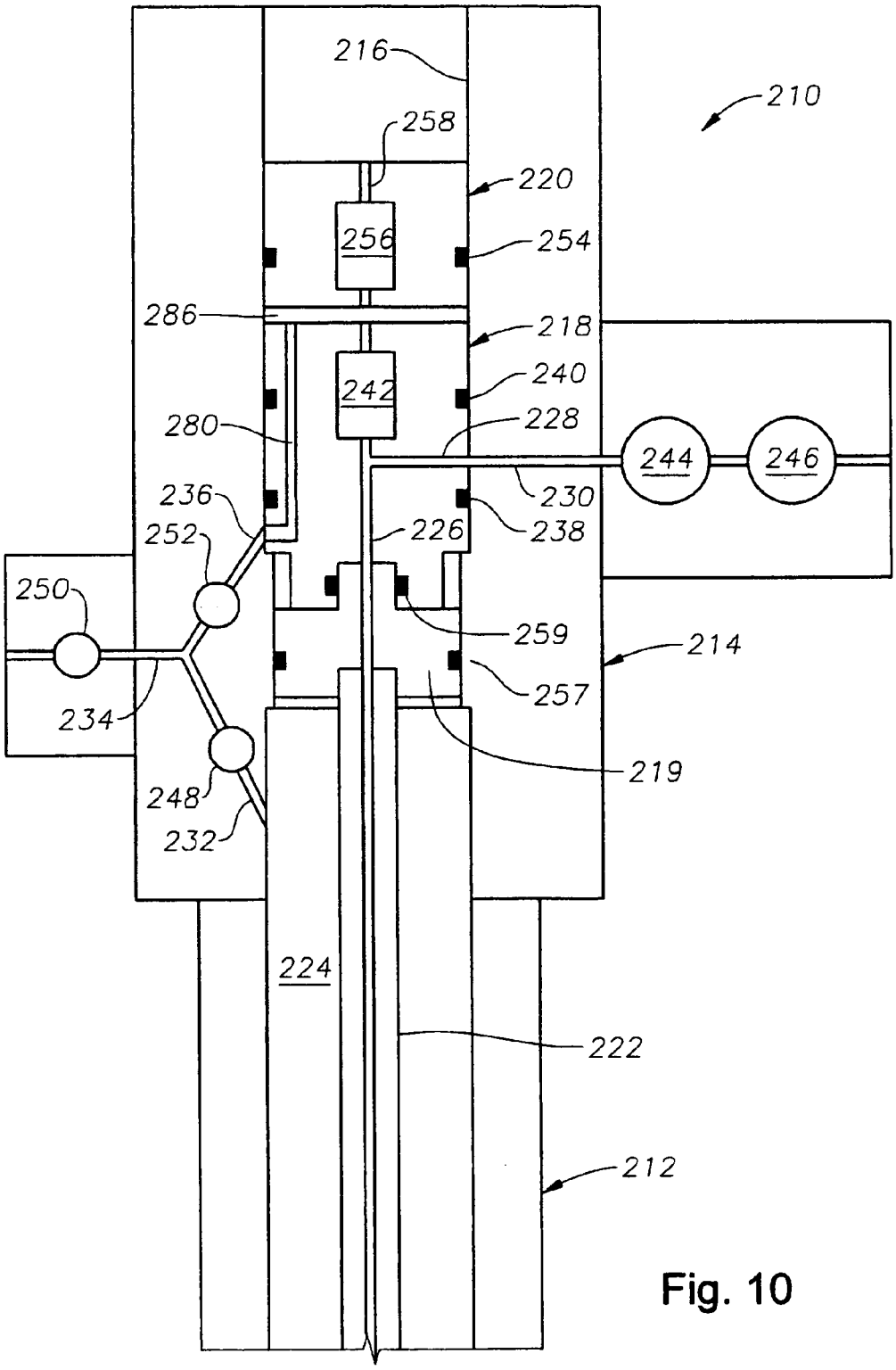
FIG. 10 is a still further embodiment of the flow completion apparatus shown in the production mode of operation with a tubing suspension conduit below the tubing hanger.

Referring now to FIG. 10, one embodiment of a flow completion apparatus according to the present invention, is generally indicated by reference numeral 210. The flow completion apparatus 210 comprises a wellhead 212, a tubing spool 214 which is connected and sealed to the wellhead and which includes a central bore 216 extending axially therethrough, a generally annular tubing hanger 218 which is supported on a shoulder located in the central bore, and a tree cap 220 which is installed in the central bore above the tubing hanger. The tubing hanger 218 is secured to the tubing spool 214 by a lockdown mechanism (not shown) and is in communication with a tubing string 222 that extends into the well bore and defines a tubing annulus 224 surrounding the tubing string. Tubing hanger 218 also includes a production bore 226 which communicates with the flowbore of the tubing string 222 and a lateral production passageway 228 which extends between the production bore and the outer diameter of the tubing hanger. The tubing spool 214 includes a production outlet 230 which communicates with the production passageway 228, an annulus passageway 232 which communicates with the tubing annulus 224, and an annulus outlet 234 which is connected to the annulus passageway 232 and a workover passageway 236 which extends between the annulus passageway 232 and an area 286 of the central bore 216 above the tubing hanger 218. In addition, the tubing hanger 218 is sealed to the tubing spool 214 by a lower, preferably metal production seal ring 238 and an upper, preferably metal production seal ring 240, each of which engages a corresponding annular sealing surface formed by the wall of the central bore 216. The communication between the workover passageway 236 and the tubing annulus 224 is sealed by tubing annulus seal ring 257 and by seal ring 259 in sealing relationship with tubing suspension conduit 219. Furthermore, the production bore 226 is sealed above the production passageway 228 by a suitable closure member 242, such as a plug, which directs the flow of oil or gas from the tubing string 222 into the production passageway 230.

In a similar manner as described for FIG. 1, the tubing hanger 218 also includes an annulus bore 280 which extends between the upper end and lower end of the tubing hanger 218. In this manner, communication between the tubing annulus 224 and the upper end of tubing hanger 218 is provided by the annulus passageway 32, the workover passageway 36, and the annulus bore 280. This arrangement permits communication between tubing annulus 224 and area 286 and also a choke and kill line in a BOP with tree cap 220 removed.

The flow completion apparatus 210 may also comprise a production master valve 244 and a production wing valve 246 to control flow through the production outlet 230, and an annulus master valve 248, an annulus wing valve 250 and a workover valve 252 to control flow through the annulus passageway 232, the annulus outlet 234 and the workover passageway 236, respectively. While these valves may be any suitable closure members, they are preferably remotely operated gate valves. Moreover, some or all of the valves may be incorporated into the body of the tubing spool 214, into separate valve blocks which are bolted onto the tubing spool, or into individual valve assemblies which are connected to their respective outlets or passageways in the tubing spool with separate lengths of conduit. Furthermore, the production outlet 230 and the annulus outlet 234 are preferably connected to respective flow loops which communicate with a surface vessel, either directly or via a manifold, in a manner that is well known in the art. See U.S. Pat. No. 5,372,199, hereby incorporated herein by reference.

In the production mode of operation of the flow completion apparatus 210, shown in FIG. 10, a first barrier between the well bore and the environment is provided by the closure member 242 production seals 238, 240, and the tubing annulus seal 257, which together serve to isolate the fluid in the wellbore from the environment above the tubing hanger. The second barrier is provided by the tree cap 220 and by a typically metal seal ring 254 which is disposed between the tree cap 220 and the tubing spool 214 and a wireline plug 256 which is positioned in an axial bore 258 extending through the tree cap. Thus, in the completion assembly 210, the first barrier is associated with the tubing hanger 218 while the second barrier is associated with the tree cap 220. This embodiment allows the removal of tubing hanger 218 while leaving tubing string and tubing suspension conduit 219 in tubing spool 214.

The embodiments described above assume a requirement for double barriers. It should be appreciated that one of the barriers may be eliminated should only one barrier be required in a particular jurisdiction.

It should be recognized that, while the present invention has been described in relation to the preferred embodiments thereof, those skilled in the art may develop a wide variation of structural and operational details without departing from the principals of the invention. For example, the various elements shown in the different embodiments may be combined in a manner not illustrated above. Therefore, the appended claims are to be construed to cover all equivalents falling within the true scope and spirit of the invention.

What is claimed is:

1. An assembly for a subsea well, the assembly comprising:

a tree body having a generally cylindrical wall forming an internal bore therethrough and a production outlet extending laterally through said wall in communication with said internal bore;

said internal wall having a landing arranged to support a tubing hanger, the tubing hanger having first seals sealing the production outlet between the tubing hanger and said internal wall, said production outlet arranged to communicate with a lateral production passageway in the tubing hanger;

a workover port extending laterally from a workover port opening in said internal wall;

said workover port opening being located below said first seals;

said tubing hanger having a second seal below said workover port opening sealing between the tubing hanger and said internal wall;

a tubing annulus passageway extending from an opening in said tree body below said second seal; and said tubing annulus passageway and workover port being arranged to be in fluid communication externally of said internal bore.

2. The assembly of claim 1 wherein said tubing hanger includes a annulus bore in communication with said workover port.

3. The assembly of claim 2 wherein said annulus bore communicates with an area above said tubing hanger.

4. The assembly of claim 2 further including a flow passageway extending from said annulus bore to a choke or kill line.

5. The assembly of claim 4 further including a circulation path extending through said tubing hanger, tubing, tubing annulus, tubing annulus passageway, workover passageway, annulus bore, flow passageway and choke or kill line.

6. The assembly of claim 2 further including a tool having an annulus outlet in communication with said annulus bore.

7. The assembly of claim 6 wherein said annulus outlet communicates with a choke or kill line.

8. The assembly of claim 2 further including a closure member sealing said internal bore above said tubing hanger.

9. The assembly of claim 8 wherein said closure member includes a flow passageway therethrough communicating with said annulus bore.

10. A flow completion apparatus for controlling the flow of fluid through a tubing string which extends into a well bore and defines a tubing annulus surrounding the tubing string, the flow completion apparatus comprising:

a wellhead housing which is installed at the upper end of the well bore;

a tubing spool which is connected over the wellhead housing and which includes a central bore that extends axially therethrough, a production outlet which communicates with the central bore, and an annulus passageway which communicates with the tubing annulus;

a tubing hanger which is supported in the central bore, is connected to an upper end of the tubing string, and includes a production bore which extends axially therethrough and a production passageway which communicates between the production bore and the production outlet;

a first closure member which is positioned in the production bore above the production passageway;

a seal which is positioned between the tubing hanger and the central bore below the production passageway;

a workover passageway in the tubing spool which extends between the annulus passageway and a portion of the central bore that is located below the seal;

an annulus bore in the tubing hanger which extends between the workover passageway and the upper end of the tubing hanger; and a fluid passageway extending between the tubing annulus and the upper end of the tubing hanger being established through the annulus passageway, the workover passageway and the annulus bore.

11. An assembly for a subsea well, the assembly comprising:

a tree body having a generally cylindrical wall forming an internal bore therethrough and a production outlet extending laterally through said wall in communication with said internal bore;

said internal wall having a landing arranged to support a tubing hanger having a production bore therethrough, the tubing hanger having first seals sealing the production outlet between the tubing hanger and said internal wall, said production outlet arranged to communicate with said production bore through a lateral production passageway in the tubing hanger;

a workover port extending laterally from a workover port opening in said internal wall;

said workover port opening being located below said first seals;

said tubing hanger having a second seal below said workover port opening sealing between the tubing hanger and said internal wall and said tubing hanger having an annulus bore in communication with said workover port opening;

a tubing annulus passageway extending from an opening in said tree body below said second seal;

said tubing annulus port and workover port being arranged to be in fluid communication externally of said internal bore; and a bypass passageway in said tubing hanger communicating said annulus bore with said production bore.

12. The assembly of claim 11 further including a flow control member controlling flow through said bypass passageway.

13. The assembly of claim 12 wherein said flow control member includes an actuator extending through said tubing hanger and tree.

14. An assembly for a subsea well, the assembly comprising:

a tree body having a generally cylindrical wall forming an internal bore therethrough and a production outlet extending laterally through said wall in communication with said internal bore;

said internal wall having a landing arranged to support a tubing hanger;

a production member disposed in said internal bore on said tubing hanger and having first seals sealing the production outlet between the production member and said internal wall, said production outlet arranged to communicate with a lateral production passageway in said production member;

a workover port extending laterally from a workover port opening in said internal wall;

said workover port opening being located below said first seals;

said tubing hanger having a second seal below said workover port opening sealing between the tubing hanger and said internal wall;

a tubing annulus passageway extending from an opening in said tree body below said second seal; and said tubing annulus port and workover port being arranged to be in fluid communication externally of said internal bore.

*15. An assembly for a subsea well, the assembly comprising:*

*a tree body having a generally cylindrical wall forming an internal bore therethrough and a production outlet extending laterally through said wall in communication with said internal bore;*

*said internal wall having a landing arranged to support a tubing hanger, said tubing hanger having a first seal sealing between said tubing hanger and said internal wall above said production outlet and a second seal sealing between said tubing hanger and said internal wall below said production outlet, said production outlet arranged to communicate with a lateral production passageway in said tubing hanger;*

*a workover port extending laterally from a workover port opening in said internal wall;*

*said workover port opening being located below said first seal;*

*said tubing hanger having a third seal below said workover port opening sealing between said tubing hanger and said internal wall;*

*a tubing annulus passageway extending from an opening in said tree body below said third seal; and*

*said tubing annulus passageway and workover port being arranged to be in fluid communication externally of said internal bore.*

*16. A well production assembly located at an upper end of a string of tubing extending into a well and including a blowout preventer with a choke or kill line, comprising:*

*a production tree having a longitudinal axis, an axial bore and a lateral production passage, the lateral production passage having an inlet at the bore and extending laterally through a sidewall of the production tree;*

*a tubing hanger landed in the axial bore and adapted to be located at an upper end of a string of tubing, the tubing hanger having a vertical production passage extending axially through the tubing hanger and a lateral production passageway which extends laterally from the vertical production passage through the tubing hanger and has an outlet at the exterior of the tubing hanger which registers with the inlet of the lateral production passage of the production tree;*

*a member closing the tubing hanger vertical production bore from the production tree axial bore, the member, tubing hanger, production tree, and blowout preventer forming an area therebetween; and*

*the tubing hanger having an annulus passage extending through the tubing hanger offset from the vertical production passage, the annulus passage having a lower end adapted to be in flow communication with a tubing annulus surrounding the string of tubing and an upper end extending through the tubing hanger in flow communication with the area.*

*17. The well production assembly of claim 16 wherein the area is in flow communication with the choke or kill line.*

*18. A well production assembly located at an upper end of a string of tubing extending into a well, comprising:*

*a production tree having a longitudinal axis, an axial bore and a lateral production passage, the lateral production passage having an inlet at the bore and extending laterally through a sidewall of the production tree;*

*a tubing hanger landed in the axial bore and adapted to be located at an upper end of a string of tubing, the tubing hanger having a vertical production passage extending axially through the tubing hanger and a lateral production passageway which extends laterally from the vertical production passage through the tubing hanger and has an outlet at the exterior of the tubing hanger which registers with the inlet of the lateral production passage of the production tree;*

*a first closure member closing the tubing hanger vertical production bore from the production tree axial bore;*

*a second closure member installed in the production tree axial bore above the tubing hanger, the second closure member, tubing hanger, and production tree forming an area therebetween; and*

*the tubing hanger having an annulus passage extending through the tubing hanger offset from the vertical production passage, the annulus passage having a lower end adapted to be in flow communication with a tubing annulus surrounding the string of tubing and an upper end extending through the tubing hanger in flow communication with the area.*

* * * * *